March 26, 1963  D. B. SPALDING  3,082,934
PRESSURE EXCHANGERS

Filed April 3, 1956  4 Sheets-Sheet 1

March 26, 1963  D. B. SPALDING  3,082,934
PRESSURE EXCHANGERS
Filed April 3, 1956  4 Sheets-Sheet 2

March 26, 1963  D. B. SPALDING  3,082,934
PRESSURE EXCHANGERS

Filed April 3, 1956  4 Sheets-Sheet 4

United States Patent Office 3,082,934
Patented Mar. 26, 1963

3,082,934
PRESSURE EXCHANGERS
Dudley Brian Spalding, 2 Vineyard Hill Road,
Wimbledon, London, England
Filed Apr. 3, 1956, Ser. No. 575,835
Claims priority, application Great Britain Apr. 22, 1955
11 Claims. (Cl. 230—69)

This invention relates to pressure exchangers.

It has been previously proposed to make use of compression and expansion waves within the cells of a pressure exchanger. Designs however have tended to follow a simplified version of the actual wave patterns established; neglect of some features of those wave patterns in the design of pressure exchangers will inevitably have a deleterious effect on efficiency of operation. There is a clear need to improve the thermodynamic reversibility of the processes by means of which cells receive and exhaust fluid.

The present invention provides in a broad aspect a pressure exchanger comprising cells, associated ducting and ports through which said ducting communicates with the cells and in which a plurality of adjacent ports are so proportioned and arranged that in the design operating conditions the pressure wave system created in cells moving relatively past said adjacent ports is a substantially centered wave system commonly shared by those ports.

One feature of the invention provides, in a pressure exchanger, a main entry port through which cells receive fluid from a passage and at least one subsidiary entry port, encountered by each cell before communication is established with said main port, through which controlled fluid entry generates a wave pattern in the cells additional but complementary to that established by communication between the main port and the cells so that a substantially centered compression wave system shared by main and subsidiary ports is created.

Another feature of the invention provides, in a pressure exchanger, a main extraction port through which cells exhaust fluid into a passage and at least one subsidiary extraction port, encountered by each cell following communication with said main port, through which controlled fluid extraction effects a reduction in reflection of pressure waves established by the communication between the main port and the cells so that a substantially centered expansion wave system shared by main and subsidiary ports is created.

In the case either of fluid entry or extraction, the subsidiary ports are preferably of considerably smaller dimensions than the main port to which they are adjacent.

The term "centered wave system" will be readily understandable by those skilled in the art of analyzing non-steady fluid flow by means of wave diagrams based on time and distance. For instance, Rudinger, in his book "Wave Diagrams for Non-Steady Flow in Ducts" (published Van Nostrand, 1955), uses the expression "a centered expansion wave" to describe an expansion wave system which originates from a single point. Similarly in a centered compression wave system, the wave characteristics converge to a single point.

The fluid conditions in the subsidiary port immediately adjacent the main port are best arranged to be closer to those obtaining in the main port than those in a subsidiary port further removed from that main port.

The preferred total width, in the direction of relative cell motion, of the subsidiary ports adjacent any one main port is determined in relation to the extent of fanning out of rarefaction waves or degree of convergence of compression waves in the cells in the design conditions of operation.

The invention can be applied to single-rotor and double-rotor pressure exchangers with one or more cycles of operation per revolution. It is applicable to high and low pressure scavenging stages, to fluid extraction and supply ducts and to transfer channels.

There will now be described, by way of example only, several embodiments of the invention. These are diagrammatically shown in the accompanying peripheral development drawings, in which FIGURE 1 will be employed to indicate the nature of the problem which arises with wave reflection in pressure exchangers.

Figure 7:
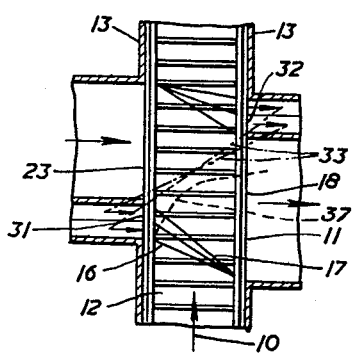
Figure 8:
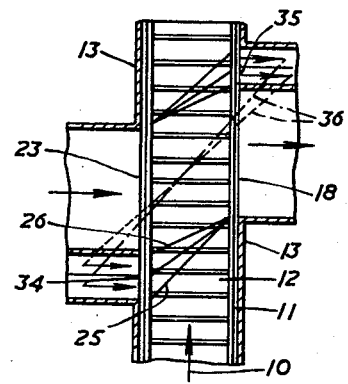
Figure 9:
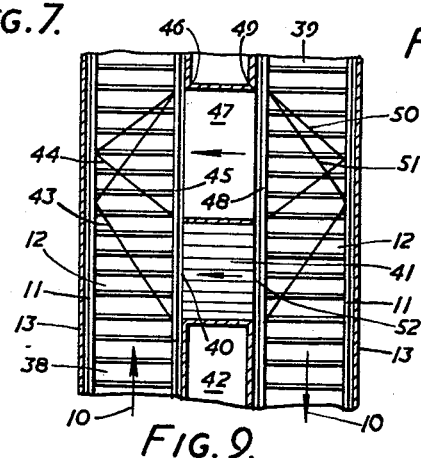

FIGURES 7 and 8 respectively, show arrangements for low pressure and high pressure scavenging.

Figure 10:
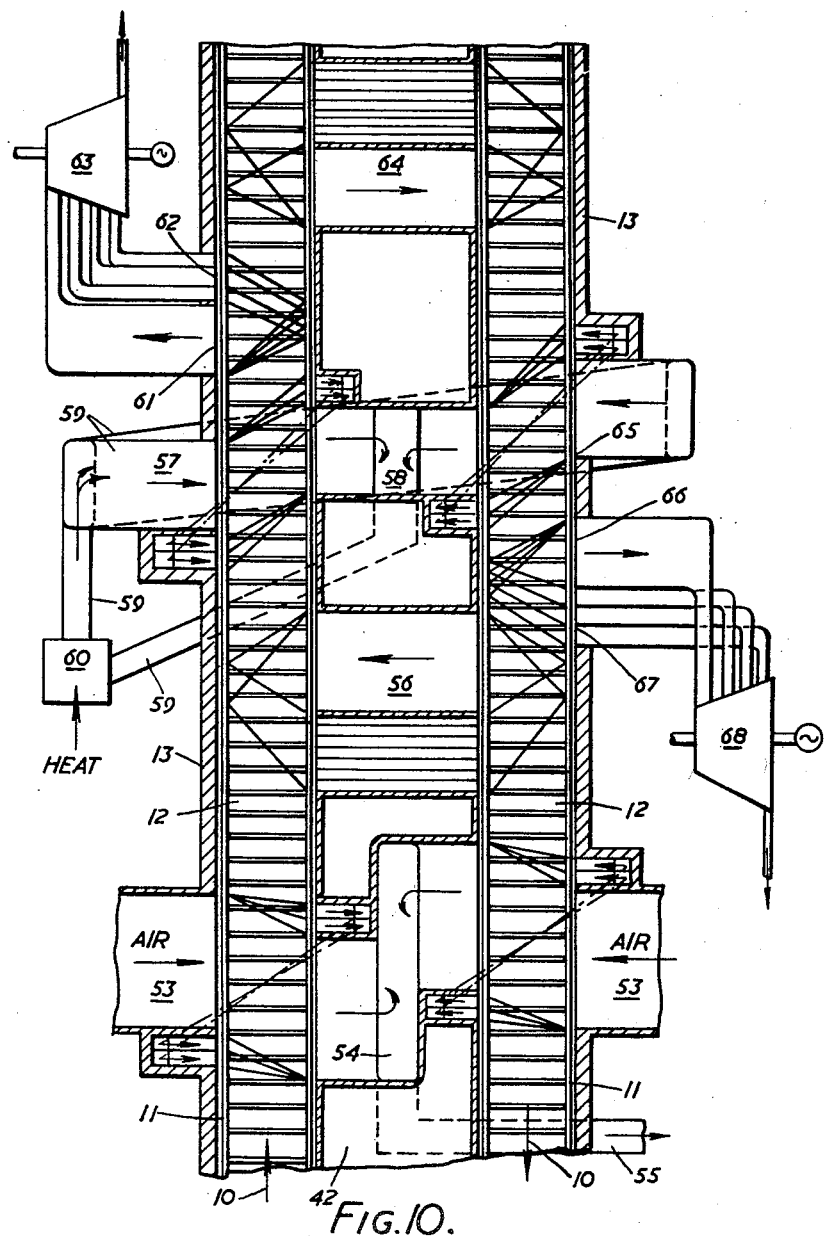

FIGURE 10 shows a two-rotor pressure exchanger with parallel scavenging.

Figure 11:
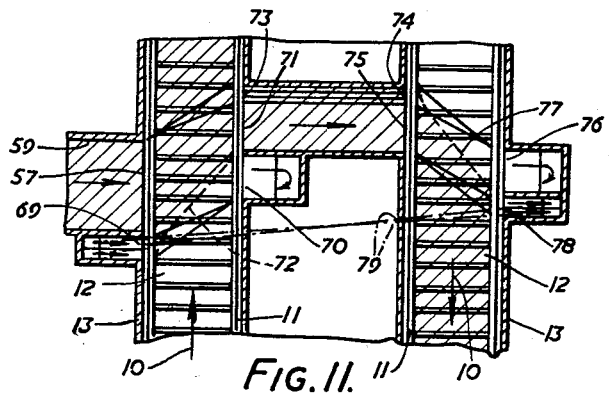

FIGURE 11 shows a series high pressure scavenging arrangement for a two-rotor pressure exchanger.

Figure 12:
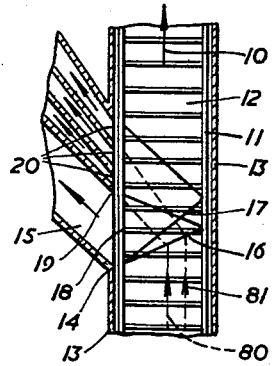
Figure 14:
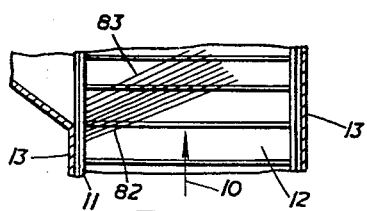

FIGURES 12 and 14 are employed to indicate more realistically wave patterns likely to be encountered at pressure exchanger ports.

Figure 13:
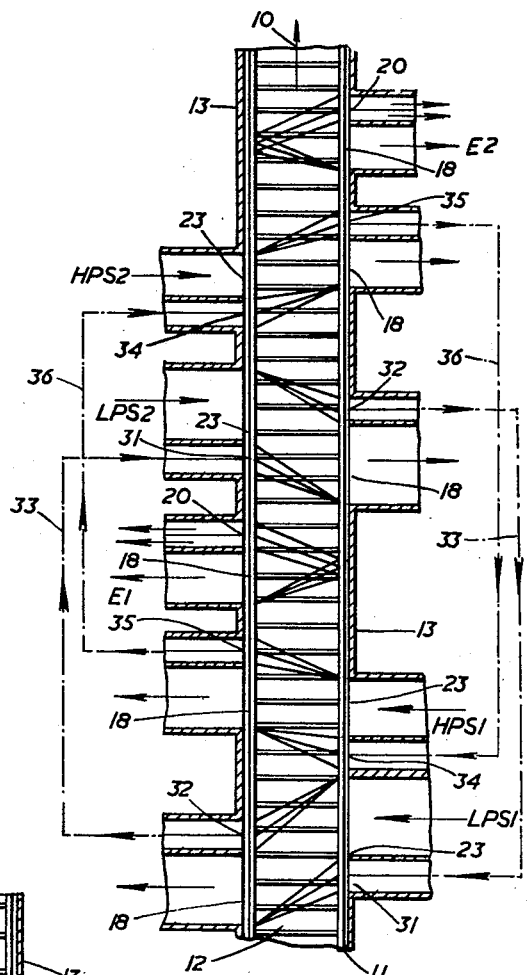

FIGURE 13 shows a single rotor pressure exchanger with two cycles of operation per revolution.

In all the figures one or more pressure exchanger cell wheels are shown rotating in the direction of the arrows 10. Either single- or double-rotor pressure exchangers are shown, the rotors 11 in them carrying a circumferential series of cells 12. The cell rotors are relatively rotatable to end plates 13 in which there are ducts through which, in operation, fluids pass into and out of the cells.

Figure 1:
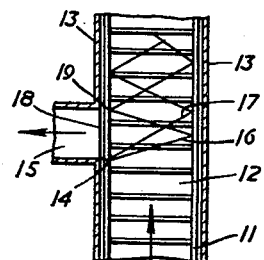

FIGURE 1 illustrates the conventional arrangement for emptying or at least partly removing some of the contents of a cell. As each cell comes into line with the edge 14 of the exhaust duct 15 an expansion wave generated by that edge is transmitted through the length of the cell. Such waves have a finite thickness and what may be termed the head of the wave arrives at the opposite end of the cell some time before the trailing edge or "tail" of the wave. As the cell wheel is rotating the path in space of the head of the wave may be indicated by the line 16 whilst that of the tail of the wave is shown by the line 17. It has been previously proposed to make the width of the port 18 through which the exhaust duct 15 communicates with the cells correspond with the time taken at the design speed of operation of the pressure exchanger for the wave 16 to pass from one end of the cell to the other and to be reflected back. Hence the cell is closed by its passage past the trailing edge 19 of the port 18 as the wave 16 arrives back at the port end of the cell. If it were not for the finite thickness of the waves, the cell contents would be stationary after the cell had passed the edge 19. As this is not so, a pattern of reflecting waves is set up within the cells which have passed the port 18 and in the absence of any means for reducing the gas to rest reversibly, the motion decays into random turbulence with a loss of available work. This is particularly true where high pressure ratios are involved in the emptying process. Although the description above with reference to FIGURE 1 is somewhat simplified the argument is reasonably valid for cells of small width.

Figure 2:
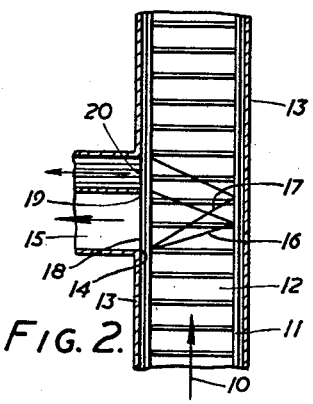
FIGURES 2 and 3 show embodiments of the invention in which emptying and filling of cells respectively are considered.
Figure 3:
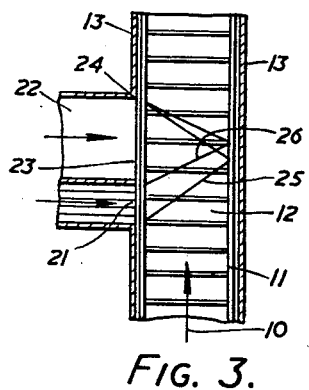

Turning now to FIGURE 2, there will be seen diagrammatically illustrated a cell emptying process in which second reflections of expansion waves are prevented or at least largely suppressed. The width of the port 18 is again defined by the edges 14 and 19 in conjunction with the wave locus 16 in the design condition of operation, so that the stream issuing through the duct 15 is of as nearly uniform condition as possible across its width. In addition to the main port 18 there are, adjacent to the trailing edge of that port, a number of subsidiary ports 20. These are each of narrow peripheral width compared with the main port. The fluid pressures and velocities in these subsidiary ports are arranged to decrease continuously as distance from the main port increases until in the port situated where the tail of the wave 17 arrives back at the port end of the cell, the velocity is practically zero. According to strict theory, one requires an infinite number of the ports 20 but even a few such ports can effect a notable reduction in the loss of available work by reducing reflection of the waves. If the arrangement of FIGURE 2 is considered in more detail it will be realised that the act of taking the cells of the rotor 11 past the ports 18 and 20 results in the conversion of a series of cells originally containing high pressure gas at rest into (i) a series of cells containing low pressure gas at rest, (ii) a steady stream of gas at an intermediate pressure passing through the duct 15 and (iii) a number of small streams of gas with pressures ranging between the intermediate pressure and low pressure passing into the ducts connected to the ports 20. These small streams of gas at differing pressures may be used in a number of ways, for instance the gas leaving the cells through the duct 15 may be brought to the upstream end of a turbine and the various streams leaving through the ports 20 may be brought to different intermediate stages of the turbine corresponding to their pressure levels. The subsidiary streams of course could also be used for the driving of auxiliaries through appropriate expansion machines. The process described above accommodates a substantially centered expansion wave system and is, at least to a first approximation, a thermodynamically reversible process; a similar arrangement can therefore be applied to the reverse process; i.e. to the entry of fluids into the cells of a pressure exchanger. FIGURE 3 illustrates this reverse process.

The arrangement of FIGURE 3 is such that each particle of the fluid content of the low pressure cells approaching the various ports is set gradually in motion and is gradually compressed by the entering fluid instead of suddenly by a shock wave as when there are no subsidiary ports 21. Fluid enters through a number of subsidiary ports 21 before the main uniform stream, arriving through the duct 22, is encountered at the port 23. The positioning and width of the ports are determined by the requirement that, in the design operating condition, all the compression waves resulting from the successive port openings should, after reflection, converge to the point of cell closure by the edge 24 of the port 23. Convergence of the compression waves at this point, i.e. the creation of a substantially centered compression wave system, results in the cells passing on beyond the port 23 with their contents at rest. The streams entering through the ports 21 gradually compress the initial content of the cells. As the speed of propagation of the wave through the cell depends partly upon the pressure ratio between the entering stream and the initial contents of the cell the speed of propagation of each wave exceeds that of its predecessor. Hence the time required for the first wave 25 to reach the opposite end of the cell and be reflected back again is longer than that required for the wave 26 which results from opening of the main port 23. The source of the streams required to enter through the port 21 at various pressure levels may be, for instance, a multi-stage compressor from which tappings are made at appropriate points.

Figure 4:
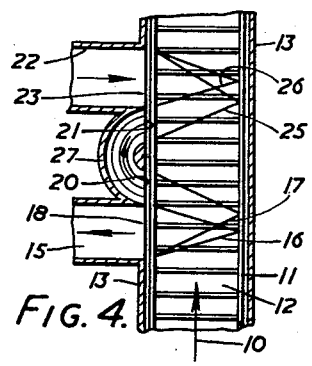
FIGURES 4 and 5 show cell emptying and filling arrangements.
Figure 5:
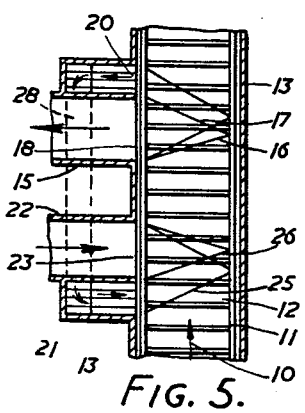

Emptying of the contents of a cell and the replacement thereof is a common requirement in pressure exchangers. FIGURE 4 illustrates how the processes illustrated in FIGURES 2 and 3 may be combined so that the subsidiary streams resulting from the emptying of cells can be used as a convenient source of the subsidiary streams needed in the filling. FIGURE 4 shows a low pressure emptying and filling process in which the subsidiary ports 20 of the emptying process are directly connected by passages 27 with the subsidiary ports 21, with which any cell communicates before it meets the inlet port 23. A similar arrangement, which is required for high pressure filling and emptying, in which the fluid entry ports are first encountered, is shown in FIGURE 5. Here the ports 20 are again directly connected to the ports 21 by passages 28 which bridge the entry duct 22 and exit duct 15.

Figure 6:
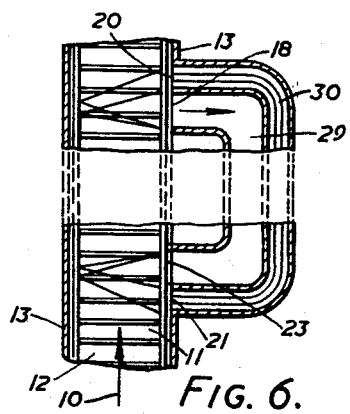
FIGURES 6 and 9 show transfer channel arrangements for single- and two-rotor pressure exchangers respectively.

In FIGURE 6 there is illustrated the same process utilised for the compression of the cell contents by the action upon them of a higher pressure fluid withdrawn from a later point in the cycle of operations. The duct through which this compressing fluid is passed is commonly known as a transfer channel and is here shown at 29. Besides this main transfer channel there are subsidiary channels 30 interconnecting the ports 20 and 21. Of course the entry and extraction ducts may be on opposite ends of the rotor. In this case the transfer channels must cross from end to end outside the rotor.

When a scavenging process is to be performed in a pressure exchanger, fluid entry and exit at opposite ends of the cells is obligatory and this requirement will now be considered in relation to FIGURES 7 and 8 which deal with low pressure and high pressure scavenging processes respectively. A cell 12 of FIGURE 7 approaching in the direction of the arrow 10 first encounters the exhaust port 18 and expansion waves fan out between the limiting waves 16 and 17 from the upstream edge of that port. The upstream edge of the port 23 is arranged to coincide with the point at which the wave 17 reaches the other end of the cell, and, between that point and the point at which the wave 16 reaches the same end of the cell, there are subsidiary ports 31 shown here in diagrammatic form as two only in number. Beyond the downstream edge of the port 18 there are further subsidiary ports 32. Compression waves are propagated across the cells over the peripheral width of the subsidiary ports 32 and these converge to a point at the other end of the cells, at which point also is found the downstream edge of the duct 23. The subsidiary ports 31 and 32 are interconnected by passages 33 shown here as chain dotted lines. The downstream end port 32 is connected to the upstream end port 31 and similarly other interconnected ports are crossed over in like manner. Fluid flows from the ports 32 through the passages 33 to the ports 31. The arrangement is such that, in the design conditions of operation, the expansion waves 16 and 17 are prevented from being reflected when they have passed across the cells, because they encounter fluid streams entering through the ports 31 of progressively decreasing pressure and increasing velocity in the downstream peripheral direction. Each entering stream is made to correspond as nearly as possible in its pressure and velocity condition, with the contents of a cell at the same circumferential position. The streams leaving through the ports 32 progressively increase in pressure and decrease in velocity in the downstream peripheral direction.

In FIGURE 8 a high pressure scavenging arrangement is shown and it is, in some respects similar to that shown in FIGURE 7. In this instance, however, a cell 12 moving in the direction of the arrow 10 first encounters the subsidiary ports 34 on the inlet side of the rotor. Through these ports successive streams of fluid enter at pressure and velocity conditions such that the compression waves 25 and 26, which are generated at the subsidiary port limits, converge at a single point at the other end of the cell. At this latter point is found the leading edge of the outlet port 18. Subsidiary ports 35 are found beyond the downstream edge of the port 18 and these are interconnected through passages 36 shown as chain dotted ended cells arranged in a ring for the compression and expansion of a fluid, means defining common end walls for the cells and a series of ducts communicating with the cells at circumferentially spaced ports in the end walls to lead fluid to and from the cells, and means for causing relative rotation between the cell ring and the end walls, means associated with an inlet port and including an auxiliary inlet port for preventing propagation of reflected compression pressure waves in the fluid of the cells after the cells have communicated with the inlet port, said auxiliary inlet port being so circumferentially spaced from said inlet port and having such peripheral limits as to generate at least one compression wave which together with the compression wave generated by the inlet port converge on a single point so as to maintain a centered compression pressure wave system in cells instantaneously coacting with said inlet port and said auxiliary inlet port and means for creating substantially the same fluid conditions in the auxiliary inlet port as to maintain the centered compression wave system substantially only in said cells instantaneously coacting with said inlet port and said auxiliary inlet port.

3. A pressure exchanger according to claim 2 further comprising partition means dividing the auxiliary port into a plurality of subsidiary ports.

4. A pressure exchanger according to claim 2 wherein said last-named means comprises duct means connected with the auxiliary port.

5. A pressure exchanger according to claim 4 wherein said duct means and the duct communicating with the cells at the inlet port connect with their respective ports along axes each disposed at an acute angle with the plane of their respective ports, which angle is aligned with a group of particle paths in cells instantaneously coacting with that port.

6. A pressure exchanger according to claim 4 wherein said last named means further comprises compressor means connected with said duct means.

7. In a pressure exchanger having a series of open ended cells arranged in a ring for the compression and expansion of a fluid, means defining common end walls for the cells and a series of ducts communicating with the cells at circumferentially spaced ports in the end walls to lead fluid to and from the cells, and means for causing relative rotation between the cell ring and the end walls, means associated with at least one of the outlet ports and including an auxiliary outlet port for preventing propagation of reflected expansion pressure waves in the fluid of the cells after the cells have communicated with the outlet port, said auxiliary outlet port being so circumferentially spaced from said outlet port and having such peripheral limits as to intercept the span of the expansion pressure wave system generated by the outlet port so as to maintain a centered expansion pressure wave system in cells instantaneously coacting with said outlet port and said auxiliary outlet port and means for creating substantially the same fluid conditions in the auxiliary outlet port as to maintain the centered expansion wave system substantially only in said cells instantaneously coacting with said outlet port and said auxiliary outlet port.

8. A pressure exchanger according to claim 7 further comprising partition means dividing the auxiliary port into a plurality of subsidiary ports.

9. A pressure exchanger according to claim 7 wherein said last named means comprises duct means connected with the auxiliary port.

10. A pressure exchanger according to claim 9 wherein said duct means and the duct communicating with the cells at the outlet port connect with their respective ports along axes each disposed at an acute angle with the plane of their respective ports, which angle is aligned with a group of particle paths in cells instantaneously coacting with that port.

11. A pressure exchanger according to claim 9 wherein said last-named means further comprises turbine means connected with said duct means.

References Cited in the file of this patent

UNITED STATES PATENTS

| | | |
|---|---|---|
| 2,461,186 | Seippel | Feb. 8, 1949 |
| 2,848,871 | Jendrassik | Aug. 26, 1958 |
| 2,852,915 | Jendrassik | Sept. 23, 1958 |

FOREIGN PATENTS

| | | |
|---|---|---|
| 553,208 | Great Britain | May 12, 1943 |
| 876,601 | France | Aug. 10, 1942 |